United States Patent
Takeda et al.

(10) Patent No.: US 10,515,463 B2
(45) Date of Patent: Dec. 24, 2019

(54) OBJECT SEGMENTATION IN A SEQUENCE OF COLOR IMAGE FRAMES BY BACKGROUND IMAGE AND BACKGROUND DEPTH CORRECTION

(71) Applicant: SONY CORPORATION, Tokyo (JP)

(72) Inventors: Hiroyuki Takeda, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 42 days.

(21) Appl. No.: 15/958,379

(22) Filed: Apr. 20, 2018

(65) Prior Publication Data

US 2019/0325611 A1    Oct. 24, 2019

(51) Int. Cl.
*G06T 7/90* (2017.01)
*G06T 7/194* (2017.01)
*G06T 7/50* (2017.01)

(52) U.S. Cl.
CPC .......... *G06T 7/90* (2017.01); *G06T 7/194* (2017.01); *G06T 7/50* (2017.01); *G06T 2207/10024* (2013.01)

(58) Field of Classification Search
None
See application file for complete search history.

(56) References Cited

U.S. PATENT DOCUMENTS

| 8,873,852 B2 | 10/2014 | Zhang et al. |
| 9,478,039 B1 | 10/2016 | Wang et al. |
| 2003/0103648 A1* | 6/2003 | Ito ............... G08B 13/19602 382/103 |

(Continued)

FOREIGN PATENT DOCUMENTS

| CN | 102034240 A | 4/2011 |
| CN | 104380704 A | 2/2015 |

(Continued)

OTHER PUBLICATIONS

Mirante, et al., "A Fast Image Segmentation Algorithm Using Color and Depth Map", 2011 3DTV Conference: The True Vision—Capture, Transmission and Display of 3D Video (3DTV-Con), IEEE, May 16, 2011, 04 pages.

(Continued)

*Primary Examiner* — Vikkram Bali
(74) *Attorney, Agent, or Firm* — Chip Law Group

(57) ABSTRACT

An image-processing apparatus includes a first-type of sensor, a second-type of sensor, and a control circuitry. The control circuitry receives an input color image frame of a sequence of color image frames from the first-type of sensor and a corresponding input depth image from the second-type of sensor. The control circuitry generates a first foreground mask of an object-of-interest for the input color image frame. The control circuitry then detects a first set of pixels in the generated first foreground mask as misclassified image pixels. The control circuitry updates the background color image and the background depth image of the scene. The control circuitry precisely extracts the object-of-interest from the input color image frame, based on at least the updated background color image and the background depth image of the scene.

21 Claims, 7 Drawing Sheets

(56) References Cited

U.S. PATENT DOCUMENTS

| | | | |
|---|---|---|---|
| 2010/0302376 A1* | 12/2010 | Boulanger | H04N 5/332 348/164 |
| 2011/0211749 A1* | 9/2011 | Tan | G06T 7/11 382/154 |
| 2011/0211754 A1* | 9/2011 | Litvak | G06K 9/00375 382/165 |
| 2014/0028794 A1 | 1/2014 | Wu et al. | |
| 2015/0294476 A1 | 10/2015 | Tang et al. | |
| 2015/0371398 A1 | 12/2015 | Qiao et al. | |
| 2018/0068431 A1 | 3/2018 | Takeda et al. | |

FOREIGN PATENT DOCUMENTS

| | | |
|---|---|---|
| CN | 105005992 A | 10/2015 |
| CN | 105335951 A | 2/2016 |
| EP | 2880634 A1 | 6/2015 |
| WO | 2014/022170 A1 | 2/2014 |

OTHER PUBLICATIONS

International Search Report and Written Opinion of PCT Application No. PCT/IB2019/053141, issued on Jul. 31, 2019, 14 pages Of ISRWO.

\* cited by examiner

OBJECT SEGMENTATION IN A SEQUENCE OF COLOR IMAGE FRAMES BY BACKGROUND IMAGE AND BACKGROUND DEPTH CORRECTION

CROSS-REFERENCE TO RELATED APPLICATIONS/INCORPORATION BY REFERENCE

None.

FIELD

Various embodiments of the disclosure relate to image processing, computer vision, and camera technologies. More specifically, various embodiments of the disclosure relate to an image-processing apparatus and method for object segmentation in a sequence of color image frames by background image and background depth correction.

BACKGROUND

Recent developments in the field of image processing, computer vision, and camera technologies have led to advancements in various image processing systems and techniques, such as object segmentation. A conventional object segmentation apparatus may segment an object-of-interest (such as a human body or human face) from an image of a scene, based on different object segmentation techniques. Examples of such object segmentation techniques may comprise, but is not limited to a compression based, a color-based, a depth-based, or a histogram based object segmentation technique.

Currently, in a distinctive color-based segmentation approach, the object-of-interest may be segmented based on subtraction of a pre-determined static background image from captured image. However, in order to generate the pre-determined static background image, the conventional object segmentation apparatus is required to capture a sequence of images of the scene when the object-of-interest is not present in the scene, which may not be desirable. The pre-determined static background image of the scene may be generated from the captured sequence of images. The background image subtraction approach may further require capture of the sequence of images from the scene with a static camera.

In another depth based approach, the conventional object segmentation apparatus may segment the object-of-interest by using a depth image which may be captured by a depth sensor. In cases where the depth sensor captures a noisy depth image comprising invalid depth values, the conventional object segmentation apparatus may segment the object-of-interest from the captured image erroneously and inaccurately.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image-processing apparatus and method for object segmentation in a sequence of color image frames by background image and background depth correction is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
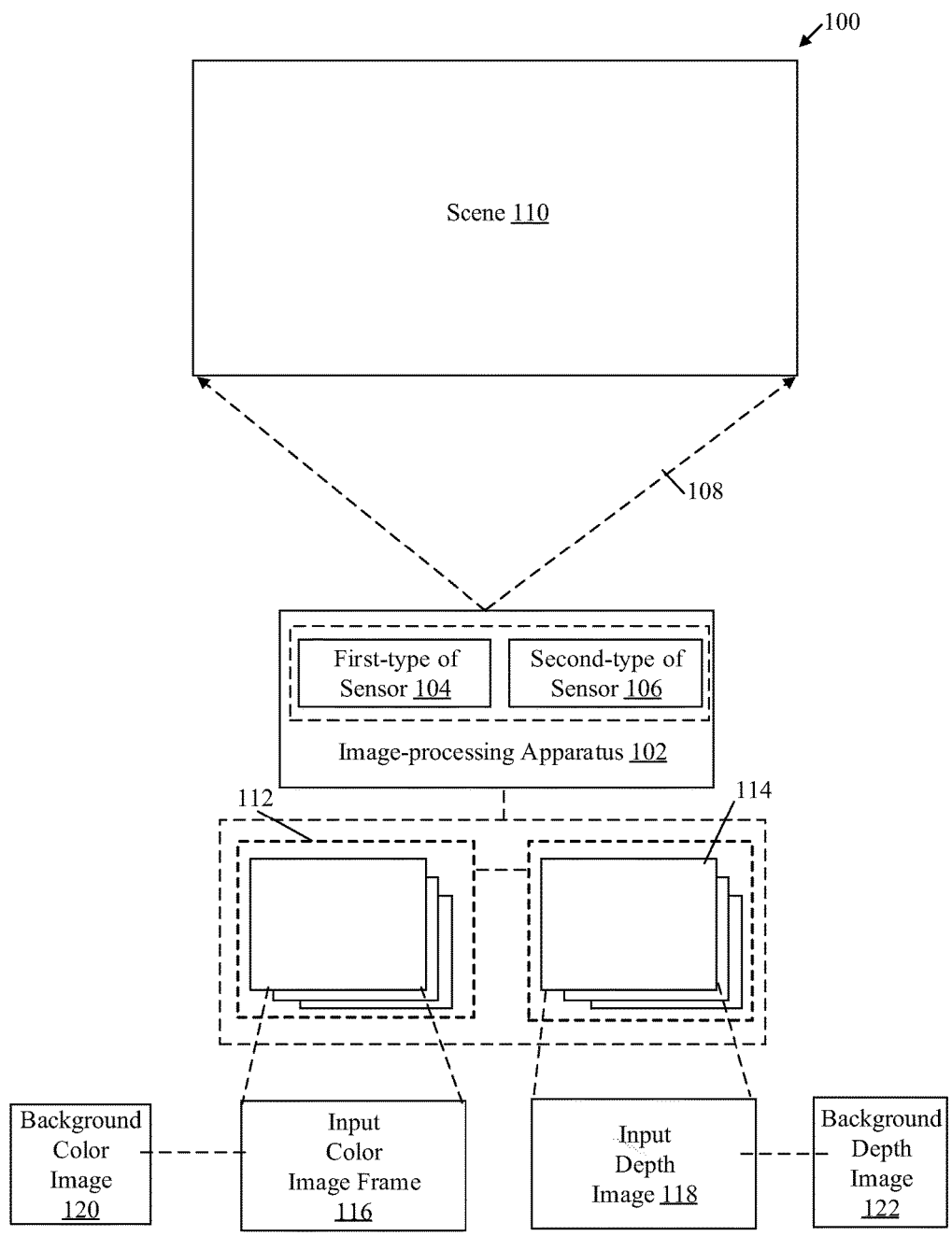
FIG. 1 is a block diagram that illustrates a network environment for an image-processing apparatus for object segmentation in a sequence of color image frames by background image and background depth correction, in accordance with an embodiment of the disclosure.

Various implementations may be found in an image-processing apparatus and method for object segmentation in a sequence of color image frames by background image and background depth correction. Exemplary aspects of the disclosure may include an image-processing apparatus that may include a first-type of sensor, a second-type of sensor, and control circuitry. The first-type of sensor may be configured to capture a sequence of color image frames of a scene. The second-type of sensor may be configured to capture a depth image for each corresponding color image frame of the sequence of color image frames. The control circuitry may be configured to receive an input color image frame of the sequence of color image frames from the first-type of sensor and a corresponding input depth image for the input color image frame from the second-type of sensor.

In accordance with an embodiment, the control circuitry may be configured to generate a first foreground mask of an object-of-interest for the input color image frame. The control circuitry may be configured to generate the first foreground mask using the input depth image for the input color image frame and a background depth image of the scene. The control circuitry may be configured to generate the first foreground mask further based on a difference between the input color image frame and a background color image of the scene. The control circuitry may be further configured to generate a second foreground mask of the object-of-interest in the input color image frame, based on at least a shape of a portion of a human body in the input color image frame of the sequence of color image frames. The control circuitry may be configured to detect a first set of pixels in the generated first foreground mask as misclassified image pixels, by a binarization of a difference between the generated first foreground mask and the generated second foreground mask of the object-of-interest. The detected first set of pixels may be a plurality of background pixels which may be misclassified as foreground pixels in the generated first foreground mask. The control circuitry may be configured to update the background color image and the background depth image of the scene using a color component, a depth component, and a spatial position of each pixel of the detected first set of pixels.

In accordance with an embodiment, the control circuitry may be configured to extract the object-of-interest from the input color image frame, based on at least the updated background color image and the background depth image of the scene. The control circuitry may be configured to classify the input color image frame to a foreground region and a background region. The background region may be mapped to the background color image. The foreground region may be mapped to the generated first foreground mask. The control circuitry may be configured to generate a first binarized difference map comprising a plurality of difference values between each pixel of a plurality of pixels of the input color image and a corresponding pixel of a plurality of pixels of the background color image.

In accordance with an embodiment, the control circuitry may be configured to determine a first set of difference values of the generated first binarized difference map, where the first set of difference values is greater than a defined threshold value. The control circuitry may be configured to map the determined first set of difference values to a first set of regions of the input color image frame. The first foreground mask is generated further based on the mapped first set of regions of the input color image frame. The control circuitry may be configured to generate a second binarized difference map comprising a plurality of difference values between each pixel of a plurality of pixels of the first foreground mask, and a corresponding pixel of a plurality of pixels of the second foreground mask. The control circuitry is further configured to generate a second binarized difference map comprising a plurality of difference values between each pixel of a plurality of pixels of the first foreground mask, and a corresponding pixel of a plurality of pixels of the second foreground mask.

In accordance with an embodiment, the control circuitry is further configured to generate a second binarized difference map comprising a plurality of difference values between each pixel of a plurality of pixels of the first foreground mask, and a corresponding pixel of a plurality of pixels of the second foreground mask. The control circuitry may be configured to detect the first set of pixels of the input color image frame as misclassified image pixels, based on the second binarized difference map. The control circuitry may be configured to map the detected first set of pixels of the first foreground mask to a first set of pixels of the input color image frame, based on a spatial position of each of the detected first set of pixels. Each pixel of the first set of pixels of the input color image frame may comprise a color component.

In accordance with an embodiment, the control circuitry may be configured to update each pixel of the first set of pixels of the background color image, based on the color component of a corresponding pixel of the first set of pixels of the input color image frame. The background color image of the scene may be updated further based on the update of each pixel of the first set of pixels of the background color image. The control circuitry may be configured to map the detected first set of pixels of the first foreground mask with a first set of pixels of the input depth image, based on a spatial position of each of the detected first set of pixels. Each of the first set of pixels of the input depth image comprises a depth component. The control circuitry may be configured to update each pixel of the first set of pixels of the background depth image of the scene, based on the depth component of a corresponding pixel of the first set of pixels of the input depth image. The background depth image of the scene may be updated further based on the update of the first set of pixels of the background depth image of the scene. The control circuitry may be configured to generate a first set of foreground masks of the object-of-interest in a first set of image frames of the sequence of color image frames.

In accordance with an embodiment, the control circuitry may be configured to detect a plurality of misclassified image pixels for each of the first set of generated foreground masks, based on at least the shape of the portion of the human body in each color image frame of the sequence of color image frames. The plurality of misclassified image pixels are background pixels which are misclassified as foreground pixels. The control circuitry may be configured to periodically or continuously update the background color image and the background depth image of the scene, based on detection of the plurality of misclassified pixels of each of the first set of generated foreground masks. The periodically or continuously updated background color image and the background depth image of the scene may be used for a precise real time or near-real time segmentation of the object-of-interest from the input color image frame and subsequent image frames of the sequence of color image frames.

FIG. 1 is a block diagram that illustrates a network environment for image processing for object segmentation in a sequence of color image frames by background image and background depth correction, in accordance with an embodiment of the disclosure. With reference to FIG. 1, there is shown a network environment 100. The network environment 100 may include an image-processing apparatus 102. The image-processing apparatus 102 may comprise a plurality of sensors (such as a first-type of sensor 104, and a second-type of sensor 106). In accordance with an embodiment, the first-type of sensor 104 may be an image sensor and the second-type of sensor 106 may be a depth sensor. The plurality of sensors may be configured to capture a plurality of color images and a plurality of depth images from a field-of-view 108 of the image-processing apparatus 102. The field-of-view 108 may comprise a scene 110 that include an object-of-interest (such as a human body or a portion of a human body). The scene 110 may further comprise a plurality of other animate or inanimate objects, such as a computer, an animal, a table, a chair, a tree, and the like.

The image-processing apparatus 102 may comprise suitable logic, circuitry, interfaces, and/or code that may be configured to receive the plurality of color images and the plurality of depth images of the scene 110 from the first-type of sensor 104 and the second-type of sensor 106. The image-processing apparatus 102 may be further configured to segment the object-of-interest from the plurality of color images and the plurality of depth images of the scene 110. The functionalities of the image-processing apparatus 102 may be implemented in portable devices, such as a high-speed computing device, or a camera, non-portable devices, such as an application server or a graphical or video processing server. Examples of the image-processing apparatus 102 may include, but are not limited to a digital camera, a digital camcorder, a camera phone, a smart phone, a virtual reality device, a gaming console, a mobile device, or a hardware video player. Other examples of the image-processing apparatus 102 may include, but are not limited to a television, a home entertainment system, an augmented reality device, a smart jewelry (e.g. smart watch).

The first-type of sensor 104 may be an image sensor that comprises suitable logic, circuitry, interfaces, and/or code that may be configured to capture the plurality of color images from the scene 110. Examples of the plurality of color images may include, but is not limited to a Joint Photographers Expert Group (JPEG) image, a Tagged Image File Format (TIFF) image, or a raw image file. The first-type of sensor 104 may have suitable optical instruments such as focusing lenses which may focus the scene 110 and/or a particular object-of-interest in the scene 110. Examples of implementation of the first-type of sensor 104 may include, but is not limited to a semiconductor charged coupled device (CCD) based image sensor, a Complementary metal-oxide-semiconductor (CMOS) based image sensor, an N-type metal-oxide-semiconductor based image sensor, a flat panel detector, or other image sensors.

The second-type of sensor 106 may be a depth sensor that comprises suitable logic, circuitry, interfaces, and/or code that may be configured to capture the plurality of depth images from the scene 110. Each of the plurality of depth images may comprise depth information associated with various objects in the scene 110 at various time instants at which the respective depth image may be captured by the second-type of sensor 106. Examples of implementation of the second-type of sensor 106 may include, but is not limited to a stereo triangulation based depth sensor, a structured light three dimensional (3D) scanner based depth sensor, or a coded aperture based depth sensor, or other depth sensors that are calibrated to operate in synchronization with the first-type of sensor 104.

In accordance with an embodiment, the first-type of sensor 104 and the second-type of sensor 106 may be configured to capture the plurality of color images and the plurality of depth images of the scene 110 concurrently. In certain scenarios, a user of the image-processing apparatus 102 may desire to capture a sequence of color image frames 116 of the scene 110. In such scenarios, the user may point the image-processing apparatus 102 towards the scene 110. In a case where the image-processing apparatus 102 is a camera which has an image capture button or user interface (UI) control, the user may press the image capture button or the UI control to initiate capture of the sequence of color image frames 112.

In some embodiments, the first-type of sensor 104 and the second-type of sensor 106 may not be integrated within the image-processing apparatus 102. In such cases, the first-type of sensor 104 and the second-type of sensor 106 may be communicatively coupled with the image-processing apparatus 102, via various wired and wireless communication protocols. Examples of such wired and wireless communication protocols may include but are not limited to at least one of a Transmission Control Protocol and Internet Protocol (TCP/IP), a Bluetooth protocol, User Datagram Protocol (UDP), Hypertext Transfer Protocol (HTTP), File Transfer Protocol (FTP), EDGE, IEEE 802.11, IEEE 802.11b, IEEE 802.11g, IEEE 802.11n, IEEE 802.11x and/or any other IEEE 802.11 protocol, multi-hop communication, wireless access point (AP), device to device communication, cellular communication protocols, or a combination or variants thereof.

In operation, the first-type of sensor 104 may be configured to capture the sequence of color image frames 112 of the scene 110. The sequence of color image frames 112 may be a video such as a flash video, an audio video interleaved (AVI) video, and a moving pictures expert group (MPEG) video, and the like. The captured sequence of color image frames 112 may comprise the plurality of objects of the scene 110. The captured sequence of color image frames 112 may further comprise the object-of-interest. The first-type of sensor 104 may be configured to transmit the sequence of color image frames 112 to the image-processing apparatus 102. The sequence of color image frames 112 may comprise an input color image frame 116.

The second-type of sensor 106 may be configured to capture a depth image for each corresponding color image frame of the sequence of color image frames 112. The second-type of sensor 106 may be configured to capture the depth image for each color image frame of the sequence of color image frames 112, concurrently with the capture of the respective color image frame by the first-type of sensor 104. Alternatively stated, the second-type of sensor 106 may be configured to capture a sequence of depth images 114 of the scene 110. Each of the sequence of depth images 114 may correspond to a different color image frame of the sequence of color image frames 112. The depth image of each color image frame of the sequence of color image frames 112 may comprise depth information associated with the scene 110 at a corresponding time instant when the respective color image frame is captured. The second-type of sensor 106 may be configured to transmit the sequence of depth images 114 to the image-processing apparatus 102. The sequence of depth images 114 may comprise an input depth image 118 of the input color image frame 116.

In accordance with an embodiment, the image-processing apparatus 102 may be configured to receive the sequence of color image frames 112 from the first-type of sensor 104. Alternatively stated, the image-processing apparatus 102 may be configured to receive the input color image frame 116 from the first-type of sensor 104. The image-processing apparatus 102 may be configured to generate a background color image 120 of the scene 110 based on the sequence of color image frames 112. For example, the image-processing apparatus 102 may be configured to generate the background color image 120 based on a first set of color image frames of the sequence of color image frames 112.

In certain scenarios, the image-processing apparatus 102 may be configured to generate the background color image 120 from the first set of color image frames by using a frame differencing technique. In other scenarios, the image-processing apparatus 102 may be configured to generate the background color image 120 from the first set of color image frames by using a mean filter technique. The generated background color image 120 may correspond to an image of the scene 110 at a time instance when the object-of-interest may not be present in the scene 110. Alternatively stated, the generated background color image 120 may comprise certain objects or regions, such as a plurality of features (such as an object, a shadow, and a colored region) of the scene 110, without the object-of-interest. The generated background color image 120 may be inaccurate and may lack a first set of features present in the scene 110. The first set of features may be a portion of the scene 110 but may not include (or may not be a part of) the object-of-interest. In cases where the object-of-interest is a person, the first set of features may comprise one or more inanimate objects (such as a handbag or a laptop) held by the object-of-interest in the scene 110. This may result in inaccurate background as well as foreground estimation.

In accordance with an embodiment, the image-processing apparatus 102 may be configured to receive the sequence of depth images 114 from the second-type of sensor 106. Alternatively stated, the image-processing apparatus 102 may be configured to receive the input depth image 118 from the second-type of sensor 106. The image-processing apparatus 102 may be configured to generate a background depth image 122 of the scene 110 based on the sequence of depth images 114. The image-processing apparatus 102 may be configured to generate the background depth image 122, based on a first set of depth images of the sequence of depth images 114.

In certain scenarios, the image-processing apparatus 102 may be configured to generate the background depth image 122 by using a frame differencing technique on the first set of depth images. In other scenarios, the image-processing apparatus 102 may be configured to generate the background depth image 122 from the first set of depth images by using a mean filter technique on the first set of depth images. In accordance with an embodiment, the generated background depth image 122 may correspond to a depth image of the scene 110 when the object-of-interest may not be present in the scene 110. Alternatively stated, the generated background depth image 122 may comprise depth information of the plurality of features (such as objects, shadows, and shades) of the scene 110, excluding the depth information of the object-of-interest The generated background depth image 122 may lack depth information for one or more features of the first set of features of the scene 110. The first set of features as described may be a portion of the scene 110 excluding the object-of-interest.

In accordance with an embodiment, the image-processing apparatus 102 may be configured to generate a first binarized difference map based on the input color image frame 116 and the background color image 120. The first binarized difference map may comprise a plurality of difference values between each pixel of a plurality of pixels of the input color image frame 116 and a corresponding pixel of a plurality of pixels of the background color image 120. A first difference value between a first pixel of the input color image frame 116 and a second pixel of the background color image 120 may comprise a first difference between a first pixel value of the first pixel and a second pixel value of the second pixel. Each of the plurality of difference values may have a different spatial position in the first binarized difference map.

In accordance with an embodiment, the image-processing apparatus 102 may be configured to determine a first set of difference values of the plurality of difference values of the generated first binarized difference map, which are greater than a defined threshold value. The image-processing apparatus 102 may be configured to map the first set of determined difference values of the first binarized difference map to a first set of regions of the input color image frame 116, based on a spatial position of each of the first set of difference values. The first set of regions of the input color image frame 116 may correspond to the object-of-interest in the input color image frame 116.

In accordance with an embodiment, the image-processing apparatus 102 may be configured to generate a first foreground mask of the object-of-interest for the input color image frame 116. The image-processing apparatus 102 may be configured to generate the first foreground mask based on the first set of regions of the input color image frame 116 which may be mapped to the first set of difference values of the first binarized difference map. The first foreground mask may be generated further based on the input depth image 118 for the input color image frame 116 and the background depth image 122 of the scene 110. The generated first foreground mask may represent the object-of-interest in the input color image frame 116. Alternatively stated, the generated first foreground mask may indicate a spatial position, a size, and a shape of the object-of-interest in the input color image frame 116. However, the generated first foreground mask may be inaccurate. For example, the generated first foreground mask may comprise certain artifacts, such as a second set of features (e.g., unwanted objects, shadows, or shades from different objects of the scene 110. Such artifacts may be a part of the scene 110 and not a part of the object-of-interest. The artifacts, such as the second set of features, of the generated first foreground mask may correspond to one or more portions of a background region of the input color image frame 116, which may be misclassified by the image-processing apparatus 102, as a foreground region.

In accordance with an embodiment, the image-processing apparatus 102 may be configured to detect a shape of a portion of a human body in the input color image frame 116. In certain scenarios, the image-processing apparatus 102 may be configured to detect the shape of the portion of the human body in the input color image frame 116 by using a human body detection technique and/or a face detection technique. In certain scenarios, the image-processing apparatus 102 may be configured to detect the shape of the portion of the human body in the input color image frame 116 by using an artificial neural network (ANN). The image-processing apparatus 102 may be configured to map the detected shape of the portion of the human body in the input color image frame 116 to a second set of regions of the input color image frame 116. The second set of regions of the input color image frame 116 may represent the object-of-interest in the input color image frame 116.

In accordance with an embodiment, the image-processing apparatus 102 may be configured to generate a second foreground mask of the object-of-interest in the input color image frame 116, based on the identified second set of regions of input color image frame 116. Alternatively stated, the image-processing apparatus 102 may be configured to generate the second foreground mask based on at least the shape of the portion of the human body in the input color image frame 116 of the sequence of color image frames 112. The second foreground mask may be generated further based on the input depth image 118.

In accordance with an embodiment, the image-processing apparatus 102 may be configured to generate a second binarized difference map between the first foreground mask and the second foreground mask. The second binarized difference map may comprise a plurality of difference values between each pixel of a plurality of pixels of the first foreground mask, and a corresponding pixel of a plurality of pixels of the second foreground mask. A first difference value between a first pixel of the first foreground mask and a second pixel of the second foreground mask may be a difference between a first pixel value of the first pixel of the first foreground mask and a second pixel value of the second pixel of the second foreground mask.

In accordance with an embodiment, the image-processing apparatus 102 may be configured to detect a first set of pixels in the generated first foreground mask as misclassified image pixels, based on the generated second binarized difference map. The detected first set of pixels may be a plurality of background pixels which may be misclassified by the image-processing apparatus 102 as foreground pixels in the generated first foreground mask. The detected first set of pixels of the generated first foreground mask may correspond to the artifacts like features of the scene 110, which may not be a portion of the object-of-interest. Each of the detected first set of pixels may comprise a color component, a depth component, and a spatial position in the first foreground mask.

In accordance with an embodiment, the image-processing apparatus 102 may be configured to map the detected first set of pixels of the first foreground mask to a first set of pixels of the input color image frame 116. The image-processing apparatus 102 may be configured to map the detected first set of pixels of the first foreground mask to the first set of pixels of the input color image frame 116. The detected first set of pixels may be mapped based on a correspondence between a spatial position of each of the detected first set of pixels of the first foreground mask and a spatial position of each of the first set of pixels of the input color image frame 116. The first set of pixels of the input color image frame 116 may correspond to the first set of features of the scene 110 which may be absent in the generated background color image 120.

In accordance with an embodiment, the image-processing apparatus 102 may be configured to update each pixel of a first set of pixels of the background color image 120, based on a color component of a corresponding pixel of the first set of pixels of the input color image frame 116. For example, the image-processing apparatus 102 may be configured to copy a pixel value of each of the first set of pixels of the input color image frame 116 to a corresponding pixel of the first set of pixels of the background color image 120. Alternatively stated, the image-processing apparatus 102 may be configured to update the background color image 120 to include the artifacts or the first set of features of the scene 110.

In accordance with an embodiment, the image-processing apparatus 102 may be configured to map the detected first set of pixels of the first foreground mask to a first set of pixels of the input depth image 118. The detected first set of pixels may be mapped based on a correspondence between a spatial position of each of the detected first set of pixels of the first foreground mask and a spatial position of each of the first set of pixels of the input depth image 118. The first set of pixels of the input color image frame 116 may correspond to depth information of the first set of features of the scene 110 which may be absent in the background depth image 122.

In accordance with an embodiment, the image-processing apparatus 102 may be configured to update each pixel of a first set of pixels of the background depth image 122, based on a depth component of a corresponding pixel of the first set of pixels of the input depth image 118. For example, the image-processing apparatus 102 may be configured to copy a pixel value of each of the first set of pixels of the input depth image 118 to a corresponding pixel of the first set of pixels of the background depth image 122. Alternatively stated, the image-processing apparatus 102 may be configured to update the background depth image 122 such that the updated background depth image 122 comprises depth information of the first set of features of the scene 110. Alternatively stated, the image-processing apparatus 102 may be configured to update the background color image 120 and the background depth image 122 of the scene 110 by using the color component, the depth component, and the spatial position of each pixel of the detected first set of pixels of the first foreground mask.

In accordance with an embodiment, the image-processing apparatus 102 may be configured to extract the object-of-interest from the input color image frame 116, by using at least the updated background color image 120 and the background depth image 122 of the scene 110. For example, the image-processing apparatus 102 may be configured to extract the object-of-interest by subtraction of the updated background color image 120 from the input color image frame 116. The image-processing apparatus 102 may be further configured to generate a first set of foreground masks of the object-of-interest in a first set of color image frames of the sequence of color image frames 112. The image-processing apparatus 102 may be further configured to detect a plurality of misclassified image pixels of each of the first set of generated foreground masks. The image-processing apparatus 102 may be further configured to update the background color image 120 and the background depth image 122 of the scene 110, periodically or non-periodically, based on detection of the plurality of misclassified pixels of each of the first set of generated foreground masks.

In accordance with an embodiment, the image-processing apparatus 102 may be further configured to periodically or continuously update the background color image 120 and the background depth image 122 of the scene 110. The image-processing apparatus 102 may be further configured to perform real time or near-real time segmentation of the object-of-interest from the input color image frame 116 and subsequent image frames of the sequence of color image frames 112. The segmentation of the object-of-interest may be performed by using the updated background color image 120 and the updated background depth image 122 (updated continuously or periodically) of the scene 110.

Figure 2:
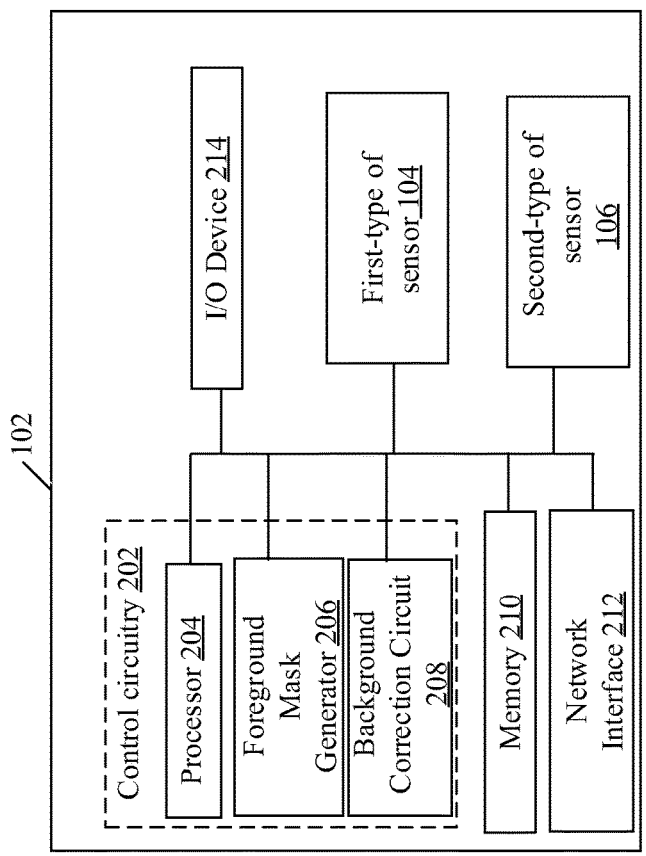
FIG. 2 is a block diagram that illustrates an exemplary image-processing apparatus for object segmentation in a sequence of color image frames by background image and background depth correction, in accordance with an embodiment of the disclosure.

FIG. 2 is a block diagram that illustrates an exemplary image-processing apparatus for object segmentation in a sequence of color image frames by background image and background depth correction, in accordance with an embodiment of the disclosure. FIG. 2 is explained in conjunction with elements from FIG. 1. With reference to FIG. 2, the image-processing apparatus 102 may include a control circuitry 202. The control circuitry 202 may comprise a processor 204, and one or more specialized processing units, such as a foreground mask generator 206, and a background correction circuit 208. The image-processing apparatus 102 may further include a memory 210, a network interface 212, and one or more input/output (I/O) devices, such as an I/O device 214. The image-processing apparatus 102 may further include the first-type of sensor 104 and the second-type of sensor 106.

The processor 204 may comprise suitable logic, circuitry, interfaces, and/or code that may be operable to generate the background color image 120, and the background depth image 122. The processor 204 may be configured to generate the first binarized difference map between the input color image frame 116, and the background color image 120. The processor 204 may further be configured to generate the second binarized difference map between the first foreground mask and the second foreground mask. The processor 204 may be configured to detect the first set of pixels of the first foreground mask as misclassified pixels. The processor 204 may be communicatively coupled to the foreground mask generator 206, the background correction circuit 208, the memory 210, the network interface 212, and the I/O device 214. The processor 204 may be implemented based on a number of processor technologies known in the art. Examples of implementations of the processor 204 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The foreground mask generator 206 may comprise suitable logic, circuitry, interfaces, and/or code that may be configured to generate the first foreground mask of the object-of-interest from the sequence of color image frames 112. The foreground mask generator 206 may be further configured to generate the second foreground mask of the object-of-interest in the input color image frame 116 based on the shape of the portion of the human body in the input color image frame 116 of the sequence of color image frames 112. Examples of implementations of the foreground mask generator 206 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The background correction circuit 208 may comprise suitable logic, circuitry, interfaces, and/or code that may be configured to update the background color image 120 of the scene 110 using the color component of each pixel of the detected first set of pixels of the first foreground mask. The background correction circuit 208 may be further configured to update the background depth image 122 of the scene 110 using the depth component of each pixel of the detected first set of pixels of the first foreground mask. Examples of implementations of the background correction circuit 208 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 210 may comprise suitable logic, circuitry, and/or interfaces that may be configured to store a machine code and/or a set of instructions executable by the processor 204, the foreground mask generator 206, and the background correction circuit 208. The memory 210 may be configured to store the received sequence of color image frames 112 from the first type of sensor 104. The memory 210 may be further configured to store the received sequence of depth images 114 from the second-type of sensor 106. Examples of implementation of the memory 210 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 212 may comprise suitable logic, circuitry, interfaces, and/or code that may be configured to connect and communicate with a plurality of electronic devices such as a computer, a smartphone, and a server. The network interface 212 may implement known technologies to support wireless communication. The network interface 212 may include, but are not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 212 may communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The I/O device 214 may comprise suitable logic, circuitry, interfaces, and/or code that may be configured to receive an input from the one or more users. The I/O device 214 may be further configured to provide an output to the one or more users. The I/O device 214 may comprise various input and output devices that may be operable to communicate with the processor 204. Examples of the input devices may include, but are not limited to, a touch screen, physical input buttons, a joystick, a microphone, and/or a docking station. Examples of the output devices may include, but are not limited to, an-inbuilt display screen, a touch screen display, and/or a speaker.

Figure 3A:
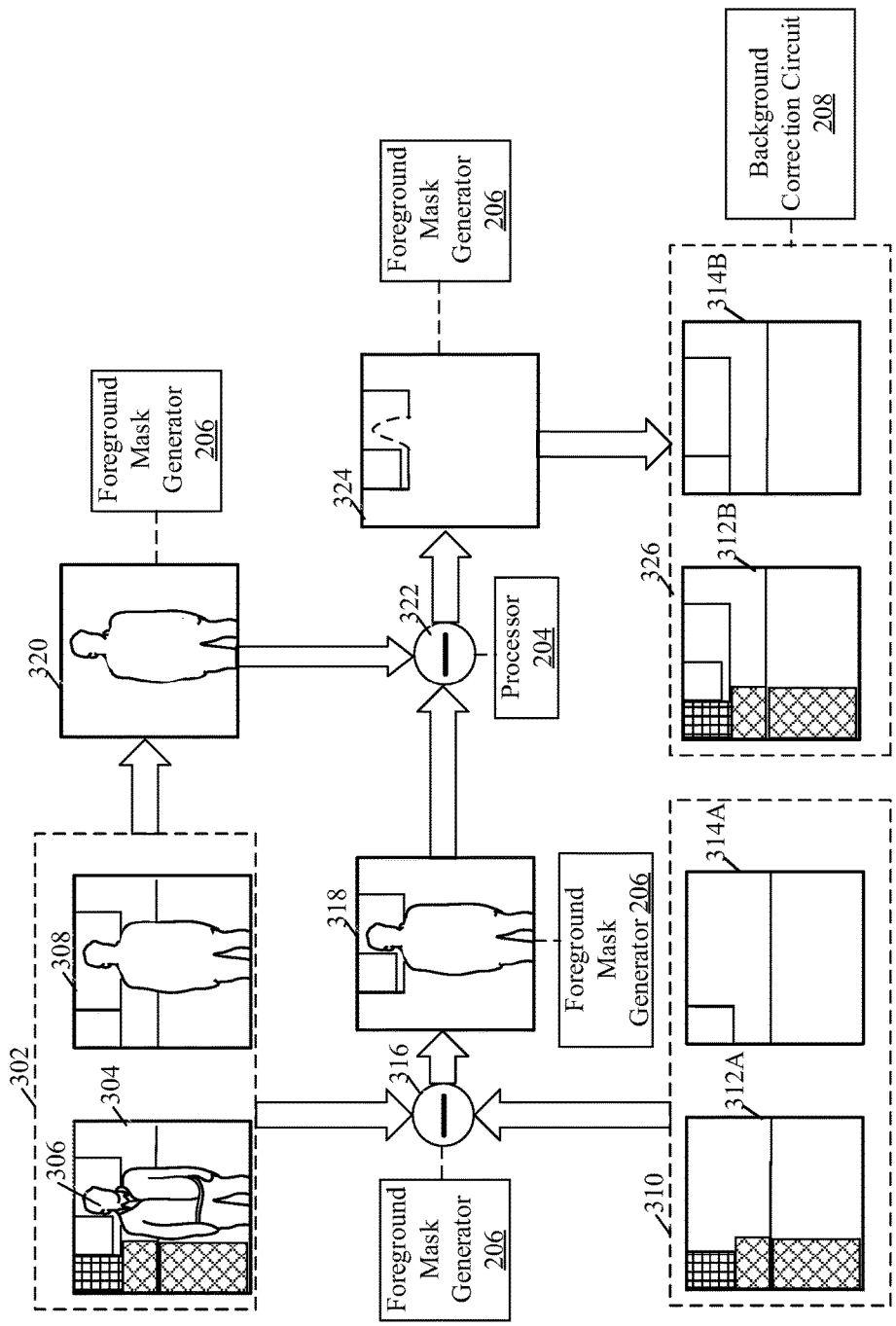
FIGS. 3A and 3B, collectively illustrates exemplary operations of the image-processing apparatus of FIG. 1 for object segmentation in a sequence of color image frames by background image and background depth correction, in accordance with an embodiment of the disclosure.

FIG. 3A illustrates exemplary operations of the image-processing apparatus of FIG. 1 for object segmentation in a sequence of color image frames by background image and background depth correction, in accordance with an embodiment of the disclosure. FIG. 3A is explained in conjunction with elements from FIG. 1 and FIG. 2.

At 302, an input color image frame 304 (such as the input color image frame 116 (FIG. 1)) and an input depth image 308 (such as the input depth image 118 of (FIG. 1)) may be received from the first-type of sensor 104 and the second-type of sensor 106 respectively. The input color image frame 304 may be one of a sequence of color image frames (such as the sequence of color image frames 112 (FIG. 1)) which may be captured by the first-type of sensor 104. The input color image frame 304 may comprise a portion of a human body which is represented in the input color image frame 304 as a first region 306 of the input color image frame 304. The first region 306 may comprise a plurality of pixels. Each of the plurality of pixels of the first region 306 of the input color image frame 304 may have a color component and a spatial position. The input depth image 308 may be one of a sequence of depth images (such as the sequence of depth images 114 (FIG. 1)) captured by the second-type of sensor 106.

At 310, a background color image 312A (such as the background color image 120 (FIG. 1)) and a background depth image 314A (such as the background depth image 122 (FIG. 1)) may be generated. The processor 204 may be configured to generate the background color image 312A based on the received sequence of color image frames. The processor 204 may be configured to generate the background depth image 314A based on the received sequence of depth images.

At 316, a first binarized difference map may be generated based on the input color image frame 304, the input depth image 308, the background color image 312A, and the background depth image 314A. The foreground mask generator 206 may be configured to generate the first binarized difference map. The first binarized difference map may comprise a plurality of difference values between each pixel of a plurality of pixels of the input color image frame 304 and a corresponding pixel of a plurality of pixels of the background color image 312A. The first binarized difference map may further comprise a plurality of difference values between the input depth image 308 and the background depth image 314A. The foreground mask generator 206 may be configured to detect a first set of difference values of the plurality of difference values of the first binarized difference map which may be greater than a first threshold. The foreground mask generator 206 may be further configured to map the determined first set of difference values to a first set of regions of the input color image frame 304.

At 318, a first foreground mask may be generated from the input color image frame 304 by the first binarized difference map of 316. The foreground mask generator 206 may be configured to generate the first foreground mask from the input color image frame 304.

At 320, a second foreground mask may be generated based on presence of a shape of the portion of the human body in the input color image frame 304. The first foreground mask is updated based on the shape of the portion of the human body in the input color image frame 304 to obtain the second foreground mask. The foreground mask generator 206 may be configured to detect the shape of the portion of the human body based on one of a face detection technique and a human body detection technique.

At 322, a second binarized difference map may be generated based on the generated first foreground mask and the generated second foreground mask. The processor 204 may be configured to generate the second binarized difference map. The second binarized difference map may comprise a plurality of difference values between each pixel of a plurality of pixels of the generated first foreground mask and a corresponding pixel of a plurality of pixels of the generated second foreground mask. The processor 204 may be further configured to map a first set of non-zero difference values of the plurality of difference values of the second binarized difference map to a first set of pixels of the first foreground mask.

At 324, the first set of pixels of the first foreground mask may be detected to be misclassified pixels. The background correction circuit 208 may be configured to detect the first set of pixels of the first foreground mask as misclassified pixels. The detected first set of pixels of the first foreground mask may be background pixels which may be misclassified as foreground pixels by the foreground mask generator 206.

At 326, the background color image 312A and the background depth image 314A may be updated to an updated background color image 312B and an updated background depth image 314B. The background correction circuit 208 may be configured to generate the updated background color image 312B, and the updated background depth image 314B based on the detected first set of pixels of the first foreground mask.

Figure 3B:
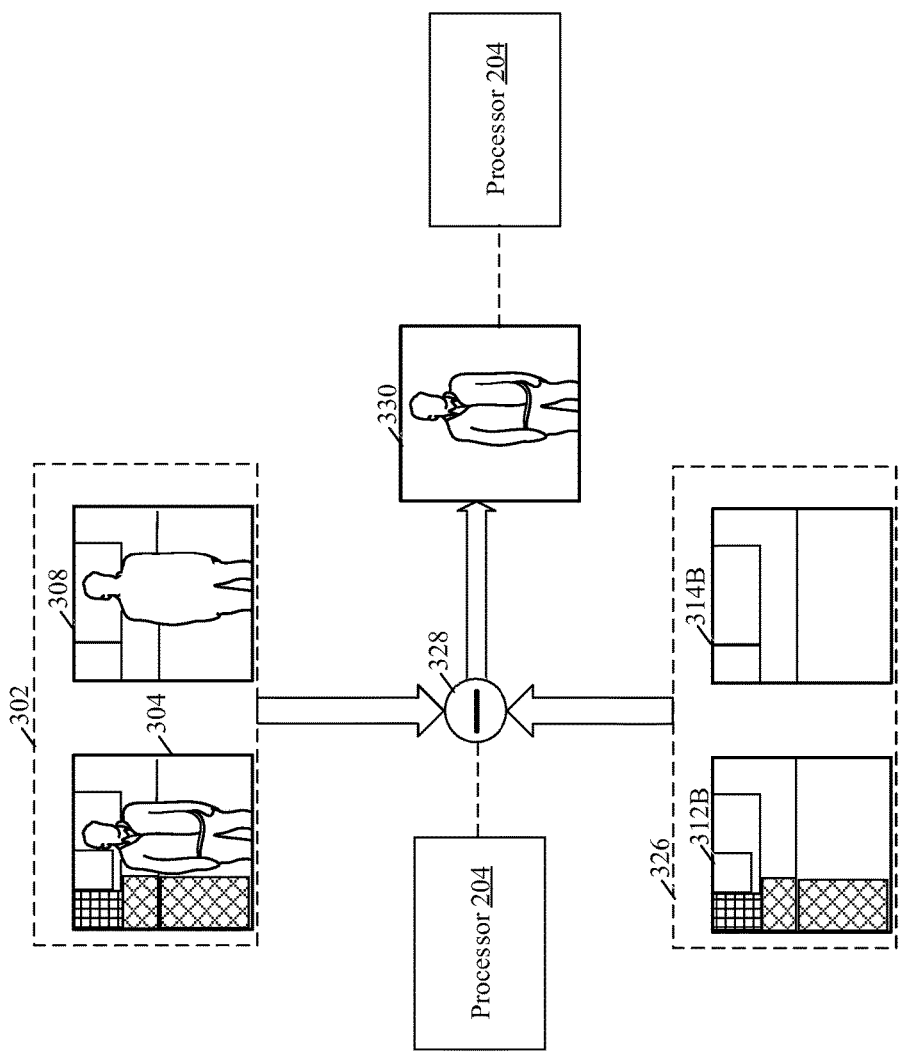

FIG. 3B illustrates exemplary operations of the image-processing apparatus of FIG. 1 for object segmentation in a sequence of color image frames by background image and background depth correction, in accordance with an embodiment of the disclosure. FIG. 3B is explained in conjunction with elements from FIGS. 1, 2, and 3A.

At 328, the updated background color image 312B may be subtracted from the input color image frame 302 to generate a first difference image. The processor 204 may be configured to subtract the updated background color image 312B from the input color image frame 302. The processor 204 may be further configured to subtract the updated background depth image 314B from the input depth image 308 to generate a second difference image.

At 330, the object of interest (such as the portion of the human body) may be extracted from the input color image frame 304 using the first difference image and the second difference image. The processor 204 may be configured to extract the object-of-interest from the input color image frame 304.

Figure 4A:
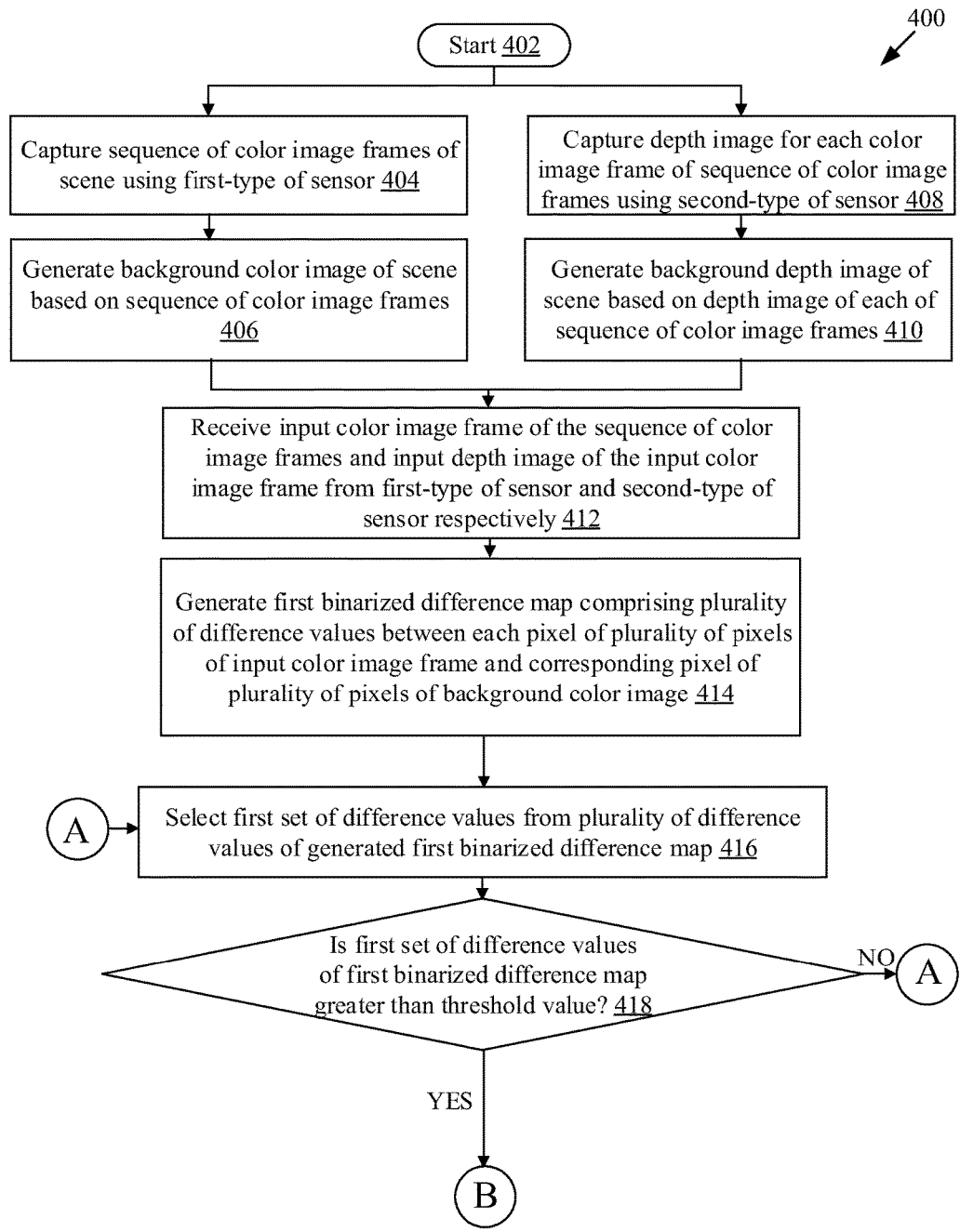
FIGS. 4A, 4B, and 4C, collectively, depict a flowchart that illustrates an exemplary method for object segmentation in a sequence of color image frames by background image and background depth correction, in accordance with an embodiment of the disclosure.
Figure 4B:
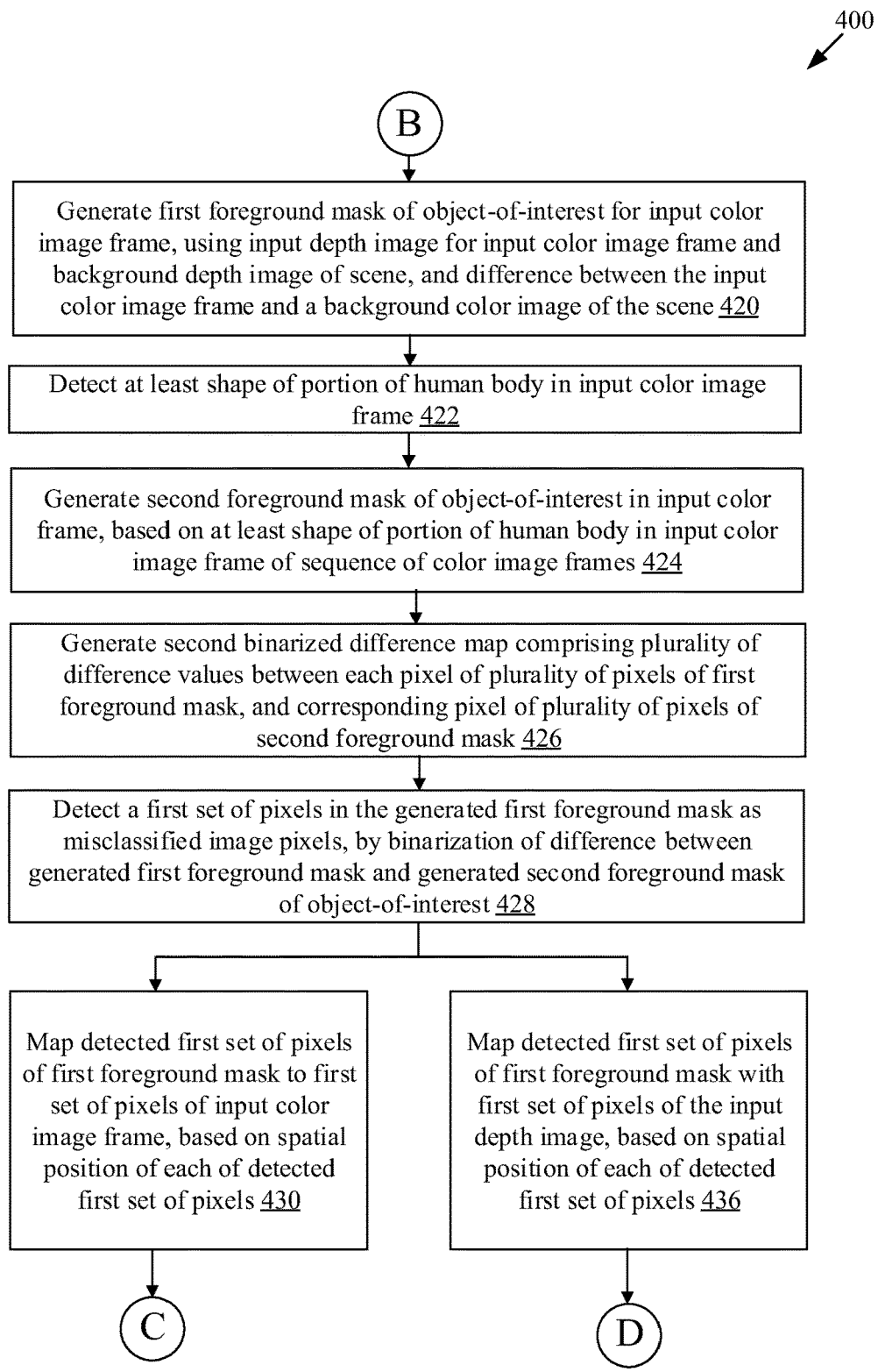
Figure 4C:
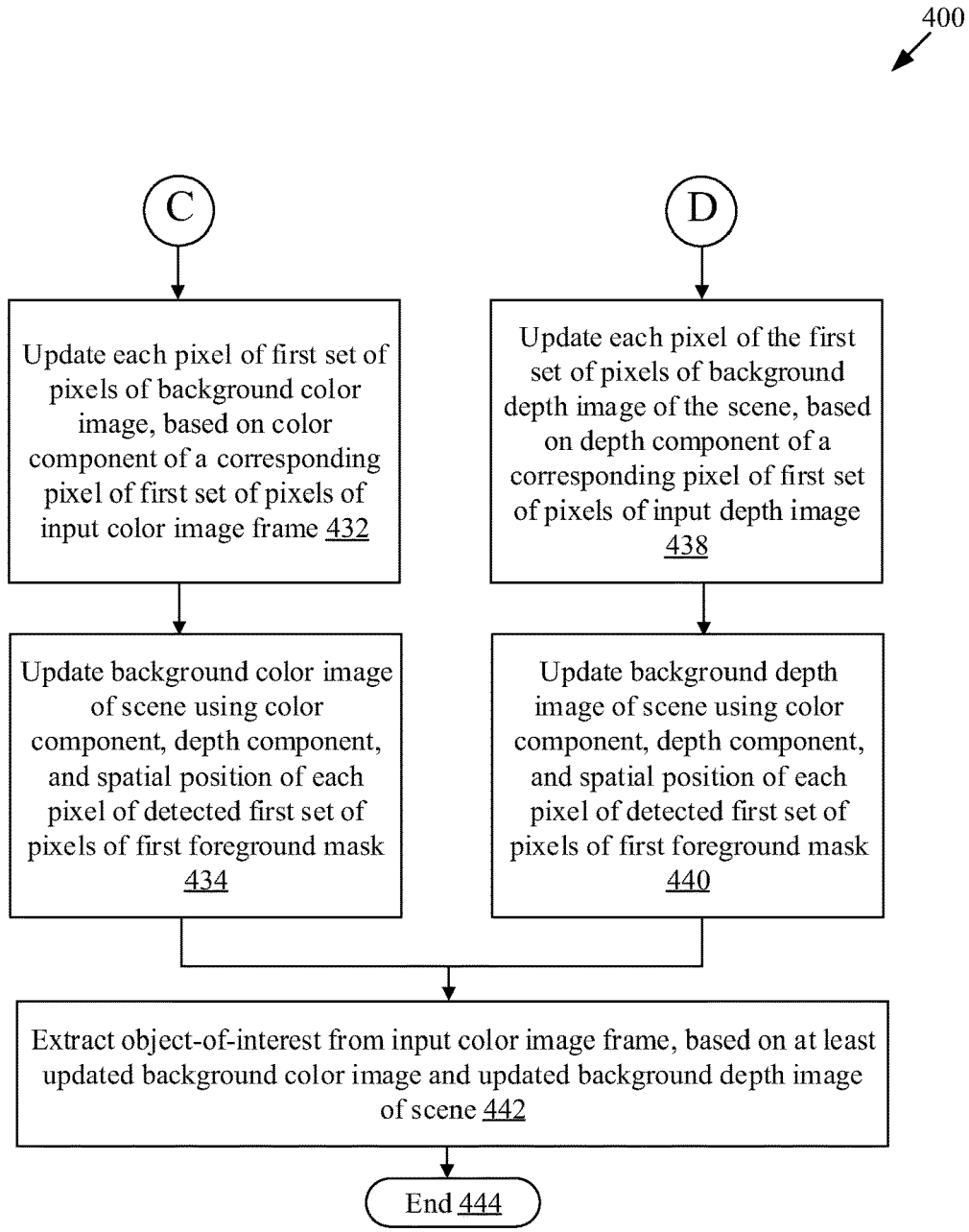

FIGS. 4A, 4B, and 4C, collectively, depict a flow chart that illustrates an exemplary method object segmentation in a sequence of color image frames by background image and background depth correction, in accordance with an embodiment of the disclosure. With reference to FIGS. 4A, 4B, and 4C, there is shown a flow chart 400. The flow chart 400 is described in conjunction with FIGS. 1, 2, 3A, and 3B. The method starts at 402. One or more operations (such as 404 and 406) may be executed concurrently with one or more other operations (such as 408 and 410) by way of parallel processing. Therefore, the control may simultaneously pass to 404 and 408.

At 404, a sequence of color image frames 112 may be captured from the scene 110. The first-type of sensor 104 may be configured to capture the sequence of color image frames 112, as discussed in FIG. 1. The sequence of color image frames 112 may be a video.

At 406, the background color image 120 of the scene 110 may be generated based on the sequence of color image frames 112. The processor 204 may be configured to generate the background color image 120, based on the sequence of color image frames 112, as discussed in FIG. 1.

At 408, a depth image may be captured for each color image frame of the sequence of color image frames 112. The second-type of sensor 106 may be configured to capture the depth image for each of the sequence of color image frames 112, as discussed in FIG. 1. The depth image of each color image frame of the sequence of color image frames 112 comprises depth information associated with the respective color image frame. Alternatively stated, the second-type of sensor 106 may capture the sequence of depth images 114. Each of the plurality of pixels of a depth image may comprise a depth component and a spatial position in the corresponding depth image.

At 410, the background depth image 122 of the scene 110 may be generated based on the depth image of each of the sequence of color image frames 112. The processor 204 may be configured to generate the background depth image 122 from the sequence of depth images 114. Alternatively stated, the processor 204 may be configured to generate the background depth image 122 of the scene 110 based on the sequence of depth images 114.

At 412, the input color image frame 116 and the input depth image 118 may be received from the first-type of sensor 104 and the second-type of sensor 106 respectively. The processor 204 may be configured to receive the input color image frame 116 and the input depth image 118 from the first-type of sensor 104 and the second-type of sensor 106 respectively.

At 414, a first binarized difference map may be generated based on the input color image frame 116 and the background color image 120. The processor 204 may be configured to generate the first binarized difference map. The first binarized difference map may comprise a plurality of difference values between each pixel of a plurality of pixels of the input color image frame 116 and a corresponding pixel of a plurality of pixels of the background color image 120. A first difference value between a first pixel of the input color image frame 116 and a second pixel of the background color image 120 may be a difference between a first pixel value of the first pixel and a second pixel value of the second pixel.

At 416, a first set of difference values may be selected from the plurality of difference values of the generated first binarized difference map. The processor 204 may be configured to select the first set of difference values. In certain scenarios, the processor 204 may be configured to randomly select the first set of difference values from the plurality of difference values of the generated first binarized difference map.

At 418, it may be determined whether each of the first set of difference values of the generated first binarized difference map is greater than a threshold value. In the case where each of the first set of difference values is less than the threshold value, the control may pass to 416. In the case where each of the first set of difference values is greater than the threshold value, the control may pass to 420. The processor 204 may be configured to map each of the first set of difference values to a different region of a first set of regions of the input color image frame 116.

At 420, the first foreground mask may be generated for the object-of-interest of the input color image frame 116. The foreground mask generator 206 may be configured to generate the first foreground mask based on the input color image frame 116, the input depth image 118, the background color image 120, and the background depth image 122. The first foreground mask may be generated further based on a difference between the input color image frame 116 and the background color image 120 of the scene 110. The first foreground mask may be generated further based on the mapped first set of regions of the input color image frame 116.

At 422, at least a shape of a portion of a human body may be detected in the input color image frame 116. The foreground mask generator 206 may be configured to detect the shape of the portion of the human body using on one of a human body detection technique and a face detection technique.

At 424, a second foreground mask of the object-of-interest may be generated based on at least the shape of portion of human body in the input color image frame 116 of the sequence of color image frames 112. The foreground mask generator 206 may be configured to generate the second foreground mask by an update of the first foreground mask. The second foreground mask may be generated further based on the input depth image 118, as discussed in FIG. 1.

At 426, a second binarized difference map may be generated. The processor 204 may be configured to generate the second binarized difference map based on a difference between the first foreground mask and the second foreground mask. The second binarized difference map comprises a plurality of difference values between each pixel of a plurality of pixels of the first foreground mask and corresponding pixel of a plurality of pixels of the second foreground mask.

At 428, a first set of pixels of the generated first foreground mask may be detected as misclassified pixels. The processor 204 may be configured to detect the first set of pixels as misclassified pixels by a binarization of difference between the generated first foreground mask and the generated second foreground mask of the object-of-interest. Each of the detected first set of pixels may have a spatial position, a color component, and a depth component. The detected first set of pixels may be a plurality of background pixels which may be misclassified as foreground pixels in the generated first foreground mask. One or more operations (such as 430, 432, and 434) may be executed concurrently with one or more other operations (such as 436, 438, and 440) by way of parallel processing. Therefore, the control may concurrently pass to 432 and 436.

At 430, the detected first set of pixels of the first foreground mask may be mapped to a first set of pixels of the input color image frame 116 based on a spatial position of each of the detected first set of pixels. The processor 204 may be configured to map the detected first set of pixels of the first foreground mask to the first set of pixels of the input color image frame 116, as discussed in FIG. 1, FIG. 2 and FIG. 3.

At 432, each pixel of a first set of pixels of the background color image 120 may be updated based on a color component of a corresponding pixel of the detected first set of pixels of the input color image frame 116. The background correction circuit 208 may be configured to update the first set of pixels of the background color image 120, as discussed in FIG. 2 and FIG. 3.

At 434, the background color image 120 of the scene 110 may be updated using the color component, the depth component, and a spatial position of each pixel of the detected first set of pixels of the first foreground mask. The background correction circuit 208 may be configured to update the background color image of the scene 110 based on the update of the first set of pixels of the background color image 120, as discussed in FIG. 1.

At 436, the detected first set of pixels of the first foreground mask may be mapped to a first set of pixels of the input depth image 118 based on a spatial position of each of the detected first set of pixels. The processor 204 may be configured to map the detected first set of pixels of the first foreground mask with the first set of pixels of the input depth image 118, as discussed in FIGS. 1, 2, and 3.

At 438, each pixel of a first set of pixels of the background depth image 122 may be updated based on a depth component of a corresponding pixel of the first set of pixels of the input depth image 118. The background correction circuit 208 may be configured to update the first set of pixels of the background depth image 122. For example, the background correction circuit 208 may be configured to copy the depth component of each pixel of the first set of pixel of the input depth image 118 to a corresponding pixel of the first set of pixels of the background depth image 122.

At 440, the background depth image 122 of the scene 110 may be updated using the color component, the depth component, and a spatial position of each pixel of the detected first set of pixels of the first foreground mask. The background correction circuit 208 may be configured to update the background color image 120 of the scene 110 based on the update of the first set of pixels of the background depth image 122.

At 442, the object-of-interest may be extracted from the input color image frame 116 based on the updated background color image 120 and the updated background depth image 122 of the scene 110. The processor 204 may be configured to extract the object-of-interest from the input color image frame 116. The control passes to end at 444.

Currently, a conventional object segmentation apparatus may be configured to segment an object-of-interest (such as a human body or human face) from a first image (which may be captured from a scene), based on a set of object segmentation approaches such as a color based segmentation approach and a depth based object segmentation approach. In the color-based segmentation approach, the object-of-interest may be segmented based on a subtraction of a pre-determined, static background image from the first image. However, to generate the pre-determined, static background image, the conventional object segmentation apparatus may require to capture a sequence of images of the scene with a static camera, when the object-of-interest is not present in the scene. The pre-determined, static background image may be generated from the sequence of images. In cases where the sequence of images are captured erroneously, the pre-determined, static background image may be erroneously generated. Hence, the conventional object segmentation apparatus may segment the object-of-interest inaccurately and/or erroneously. Moreover, the color-based segmentation approach may be deemed to be cumbersome.

In the depth based approach, the conventional object segmentation apparatus may segment the object-of-interest by using a depth image which may be captured by a depth sensor. In cases where the depth sensor captures the depth image which comprises noisy, invalid depth values, the object-of-interest may be in accurately segmented.

In accordance with an embodiment of the disclosure, an image-processing apparatus is disclosed. The image-processing apparatus (such as the image-processing apparatus 102 (FIG. 1)) comprises a first-type of sensor (such as the first-type of sensor 104 (FIG. 1)), a second-type of sensor (such as the second-type of sensor 106 (FIG. 1)), and a control circuitry (such as the control circuitry 202 (FIG. 2)). The first-type of sensor 104 may be configured to capture a sequence of color image frames (for example, the sequence of color image frames 112 (FIG. 1)) of a scene (such as the scene 110 (FIG. 1)). The second-type of sensor 106 may be configured to capture a depth image for each corresponding color image frame of the sequence of color image frames 112. The control circuitry 202 may be configured to receive an input color image (such as the input color image frame 116 (FIG. 1)) and an input depth image (such as the input depth image 118 (FIG. 1)).

The control circuitry 202 may be configured to generate a first foreground mask of an object-of-interest for the input color image frame 116, using the input depth image 118 for the input color image frame 116 and a background depth image (such as the background depth image 122 (FIG. 1)) of the scene 110, and a difference between the input color image frame 116 and a background color image (such as the background color image 120 (FIG. 1)) of the scene 110. The control circuitry 202 may be configured to generate a second foreground mask of the object-of-interest in the input color image frame 116, based on at least a shape of a portion of a human body in the input color image frame 116 of the sequence of color image frames 112. The control circuitry 202 may be configured to detect a first set of pixels in the generated first foreground mask as misclassified image pixels, by binarization of a difference between the generated first foreground mask and the generated second foreground mask of the object-of-interest. The detected first set of pixels are a plurality of background pixels which are misclassified as foreground pixels in the generated first foreground mask. The control circuitry 202 may be configured to update the background color image 120 and the background depth image 122 of the scene 110 using a color component, a depth component, and a spatial position of each pixel of the detected first set of pixels. The control circuitry 202 may be configured to extract the object-of-interest from the input color image frame 116, based on at least the updated background color image 120 and the background depth image 122 of the scene 110.

Thus, for object segmentation in a sequence of color image frames by background image and background depth correction, the disclosed image-processing apparatus 102 advantageously provides a new background correction based approach to alleviate errors in the background color image 120 and the background depth image 122. In accordance with an embodiment, the control circuitry 202 first generates the first foreground mask. The control circuitry 202 then accurately detects the first set of pixels in the first foreground mask as misclassified pixels. The first set of pixels may be a plurality of background pixels which have been erroneously classified as a plurality of foreground pixels. The detection of the first set of pixels of the first foreground mask as the misclassified pixels has been discussed in the FIGS. 1, 2, 3A, 3B, 4A, 4B, and 4C. The control circuitry 202 may be configured to continuously update the background color image 120 and the background depth image 122 based on a color component, a depth component and a spatial position of the first set of pixels of the first foreground mask. The control circuitry 202 may be configured to extract accurately the object-of-interest from the input color image frame 116 using the continuously updated background color image and the updated background depth image.

In conventional techniques, an object-of-interest may be extracted from a first image using a background color image which may not be updated and/or corrected. In the case where the background color image is erroneous, the object-of-interest may be extracted erroneously. In contrast, the control circuitry 202 of the disclosed image-processing apparatus 102 may update and/or correct the background color image 120 and the background depth image 122 based on the detection of misclassified pixels in the generated first foreground mask. Instead of using the background color image 120 without updating and/or correction of the background color image (as in conventional systems), one or more specialized hardware, such as the background correction circuit 208 of the disclosed image-processing apparatus 102 updates the background color image 120 prior to object segmentation. The background correction circuit 208 further provides an ability to the image-processing apparatus 102 to efficiently and effectively extract the object-of-interest from the input color image frame 116 with enhanced accuracy than conventional systems, by updating the background color image 120 and background depth image 122 prior to object segmentation.

Various embodiments of the disclosure may provide a non-transitory computer readable medium and/or storage medium having stored thereon, a set of instructions executable by a machine and/or a computer to operate an image-processing apparatus for object segmentation in a sequence of color image frames by background image and background depth correction. The set of instructions may cause the machine and/or computer to perform operations that comprise capture of a sequence of color image frames of a scene. A depth image for each corresponding color image frame of the sequence of color image frames may be captured by the second-type of sensor. An input color image frame of the sequence of color image frames may be received by a control circuitry from the first-type of sensor. A corresponding input depth image for the input color image frame may be received by the control circuitry from the second-type of sensor.

A first foreground mask of an object-of-interest for the input color image frame may be generated using the input depth image for the input color image frame and a background depth image of the scene. A second foreground mask of the object-of-interest in the input color image frame may be generated based on at least a shape of a portion of a human body in the input color image frame of the sequence of color image frames. A first set of pixels in the generated first foreground mask may be detected as misclassified image pixels, by a binarization of a difference between the generated first foreground mask and the generated second foreground mask of the object-of-interest. The background color image and the background depth image of the scene may be updated using a color component, a depth component, and a spatial position of each pixel of the detected first set of pixels. The object-of-interest may be extracted from the input color image frame, based on at least the updated background color image and the background depth image of the scene.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. An image-processing apparatus, comprising:
   a first-type of sensor configured to capture a sequence of color image frames of a scene;
   a second-type of sensor configured to capture a depth image for each corresponding color image frame of the sequence of color image frames; and
   control circuitry configured to:
      receive an input color image frame of the sequence of color image frames from the first-type of sensor and a corresponding input depth image for the input color image frame from the second-type of sensor;
      generate a first foreground mask of an object-of-interest for the input color image frame, using the input depth image for the input color image frame and a background depth image of the scene, and a difference between the input color image frame and a background color image of the scene;
      generate a second foreground mask of the object-of-interest in the input color image frame, based on at least a shape of a portion of a human body in the input color image frame of the sequence of color image frames;
      detect a first set of pixels in the generated first foreground mask as misclassified image pixels, by binarization of a difference between the generated first foreground mask and the generated second foreground mask of the object-of-interest, wherein the detected first set of pixels are a plurality of background pixels which are misclassified as foreground pixels in the generated first foreground mask;
      update the background color image and the background depth image of the scene using a color component, a depth component, and a spatial position of each pixel of the detected first set of pixels; and
      extract the object-of-interest from the input color image frame, based on at least the updated background color image and the background depth image of the scene.

2. The image-processing apparatus of claim 1, wherein the control circuitry is further configured to classify the input color image frame to a foreground region and a background region, wherein the background region is mapped to the background color image, and wherein the foreground region is mapped to the generated first foreground mask.

3. The image-processing apparatus of claim 1, wherein the control circuitry is further configured to generate a first binarized difference map comprising a plurality of difference values between each pixel of a plurality of pixels of the input color image and a corresponding pixel of a plurality of pixels of the background color image.

4. The image-processing apparatus of claim 3, wherein the control circuitry is further configured to determine a first set of difference values of the generated first binarized difference map, greater than a defined threshold value, wherein the control circuitry is configured to map the determined first set of difference values to a first set of regions of the input color image frame, and wherein the first foreground mask is generated further based on the mapped first set of regions of the input color image frame.

5. The image-processing apparatus of claim 1, wherein the control circuitry is further configured to generate a second binarized difference map comprising a plurality of difference values between each pixel of a plurality of pixels of the first foreground mask, and a corresponding pixel of a plurality of pixels of the second foreground mask, and wherein the control circuitry is configured to detect the first set of pixels of the input color image frame as misclassified image pixels, based on the second binarized difference map.

6. The image-processing apparatus of claim 5, wherein the control circuitry is further configured to map the detected first set of pixels of the first foreground mask to a first set of pixels of the input color image frame, based on a spatial position of each of the detected first set of pixels, and wherein each pixel of the first set of pixels of the input color image frame comprises a color component.

7. The image-processing apparatus of claim 6, wherein the control circuitry is further configured to update each pixel of the first set of pixels of the background color image, based on the color component of a corresponding pixel of the first set of pixels of the input color image frame, and wherein the background color image of the scene is updated further based on the update of each pixel of the first set of pixels of the background color image.

8. The image-processing apparatus of claim 1, wherein the control circuitry is further configured to map the detected first set of pixels of the first foreground mask with a first set of pixels of the input depth image, based on a spatial position of each of the detected first set of pixels, and wherein each of the first set of pixels of the input depth image comprises a depth component.

9. The image-processing apparatus of claim 8, wherein the control circuitry is further configured to update each pixel of the first set of pixels of the background depth image of the scene, based on the depth component of a corresponding pixel of the first set of pixels of the input depth image, and wherein the background depth image of the scene is updated further based on the update of the first set of pixels of the background depth image of the scene.

10. The image-processing apparatus of claim 1, wherein the control circuitry is further configured to generate a first set of foreground masks of the object-of-interest in a first set of image frames of the sequence of color image frames.

11. The image-processing apparatus of claim 10, wherein the control circuitry is further configured to detect a plurality of misclassified image pixels for each of the first set of generated foreground masks, based on at least the shape of the portion of the human body in each color image frame of the sequence of color image frames, and wherein the plurality of misclassified image pixels are background pixels which are misclassified as foreground pixels.

12. The image-processing apparatus of claim 11, the control circuitry is further configured to periodically or continuously update the background color image and the background depth image of the scene, based on the detection of the plurality of misclassified pixels of each of the first set of generated foreground masks, wherein the periodically or the continuously updated background color image and the background depth image of the scene is used for real time or near-real time segmentation of the object-of-interest from the input color image frame and subsequent image frames of the sequence of color image frames.

13. A method comprising:
in an image-processing apparatus, comprising a first-type of sensor, a second-type of sensor, and control circuitry:
capturing, by the first-type of sensor, a sequence of color image frames of a scene;
capturing, by the second-type of sensor, a depth image for each corresponding color image frame of the sequence of color image frames;
receiving, by the control circuitry, an input color image frame of the sequence of color image frames from the first-type of sensor and a corresponding input depth image for the input color image frame from the second-type of sensor;
generating, by the control circuitry, a first foreground mask of an object-of-interest for the input color image frame, using the input depth image for the input color image frame and a background depth image of the scene, and a difference between the input color image frame and a background color image of the scene;
generating, by the control circuitry, a second foreground mask of the object-of-interest in the input color image frame, based on at least a shape of a portion of a human body in the input color image frame of the sequence of color image frames;
detecting, by the control circuitry, a first set of pixels in the generated first foreground mask as misclassified image pixels, by binarization of a difference between the generated first foreground mask and the generated second foreground mask of the object-of-interest, wherein the detected first set of pixels are a plurality of background pixels which are misclassified as foreground pixels in the generated first foreground mask;
updating, by the control circuitry, the background color image and the background depth image of the scene using a color component, a depth component, and a spatial position of each pixel of the detected first set of pixels; and
extracting, by the control circuitry, the object-of-interest from the input color image frame, based on at least the updated background color image and the background depth image of the scene.

14. The method of claim 13, further comprising classifying, by the control circuitry, the input color image frame to a foreground region and a background region, wherein the background region is mapped to the background color image, and wherein the foreground region is mapped to the generated first foreground mask.

15. The method of claim 13, further comprising generating, by the control circuitry, a first binarized difference map comprising a plurality of difference values between each pixel of a plurality of pixels of the input color image and a corresponding pixel of a plurality of pixels of the background color image.

16. The method of claim 15, further comprising determining, by the control circuitry, a first set of difference values of the generated first binarized difference map, greater than a defined threshold value, mapping, by the control circuitry, the determined first set of difference values to a first set of regions of the input color image frame, and wherein the first foreground mask is generated further based on the mapped first set of regions of the input color image frame.

17. The method of claim 15, further comprising generating, by the control circuitry, a second binarized difference map comprising a plurality of difference values between each pixel of a plurality of pixels of the first foreground mask, and a corresponding pixel of a plurality of pixels of the second foreground mask, and detecting, by the control circuitry, the first set of pixels of the input color image frame as misclassified image pixels, based on the second binarized difference map.

18. The method of claim 17, further comprising mapping, by the control circuitry, the detected first set of pixels of the first foreground mask to a first set of pixels of the input color image frame, based on a spatial position of each of the detected first set of pixels, and wherein each pixel of the first set of pixels of the input color image frame comprises a color component.

19. The method of claim 18, further comprising, updating, by the control circuitry, each pixel of the first set of pixels of the background color image, based on the color component of a corresponding pixel of the first set of pixels of the input color image frame, and wherein the background color image of the scene is updated further based on the update of each pixel of the first set of pixels of the background color image.

20. The method of claim 13, further comprising mapping, by the control circuitry, the detected first set of pixels of the first foreground mask with a first set of pixels of the input depth image, based on a spatial position of each of the detected first set of pixels, and wherein each of the first set of pixels of the input depth image comprises a depth component.

21. The method of claim 20, further comprising updating, by the control circuitry, each pixel of the first set of pixels of the background depth image of the scene, based on the depth component of a corresponding pixel of the first set of pixels of the input depth image, and wherein the background depth image of the scene is updated further based on the update of the first set of pixels of the background depth image of the scene.

* * * * *